F. P. PEEL.
SPEED INDICATOR AND PACKAGE DROPPER FOR AIRSHIPS.
APPLICATION FILED JULY 22, 1912.
1,081,984.
Patented Dec. 23, 1913.
2 SHEETS—SHEET 1.
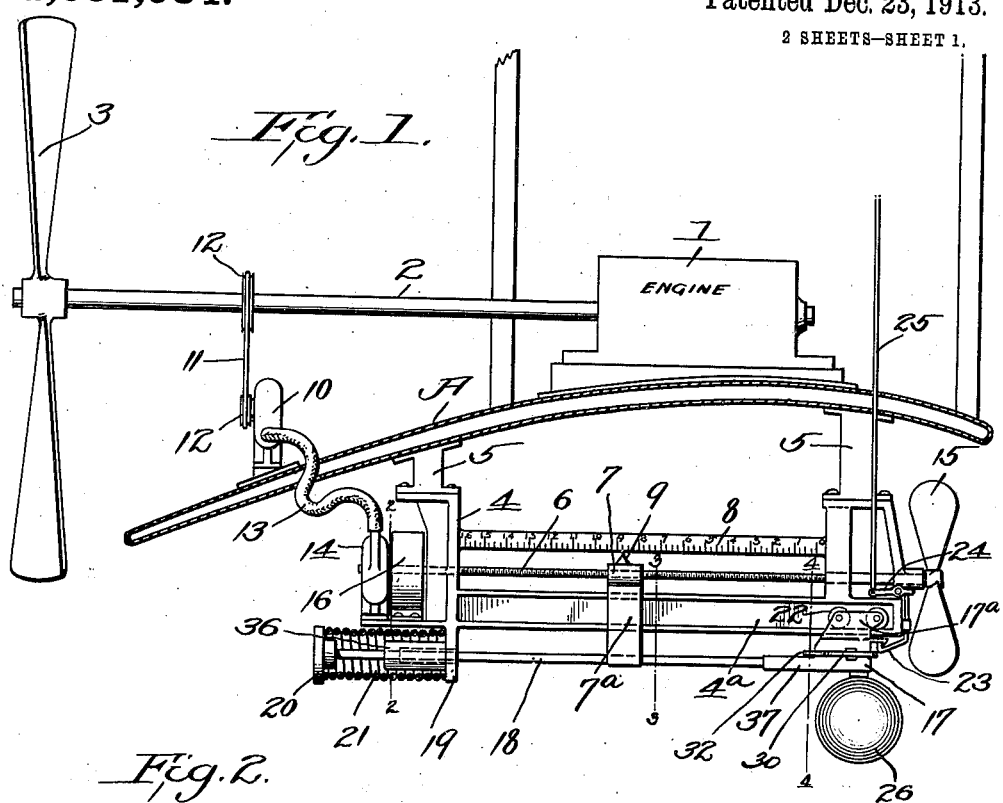
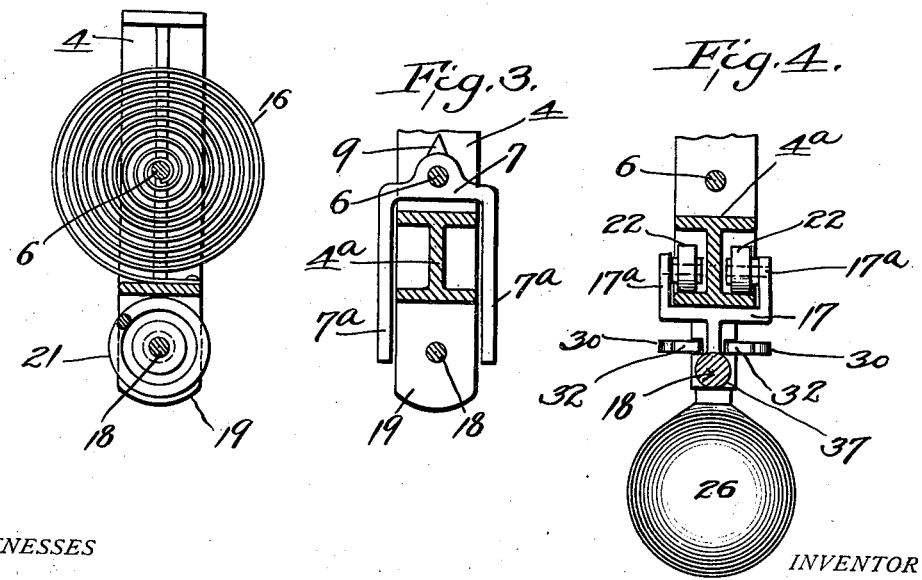
WITNESSES
INVENTOR
Fred P. Peel
Attorney F. P. PEEL.
SPEED INDICATOR AND PACKAGE DROPPER FOR AIRSHIPS.
APPLICATION FILED JULY 22, 1912.
1,081,984.  Patented Dec. 23, 1913.
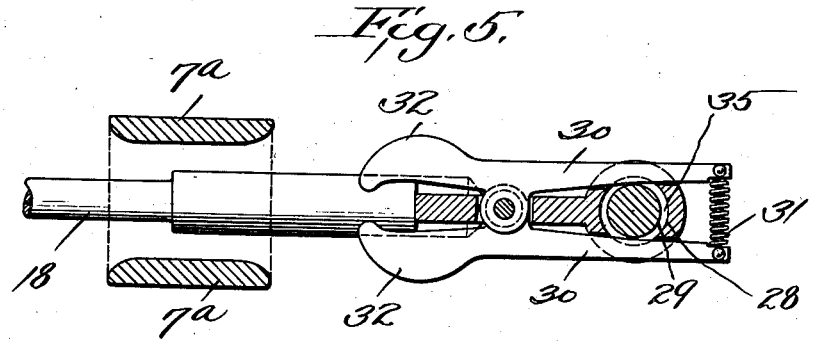
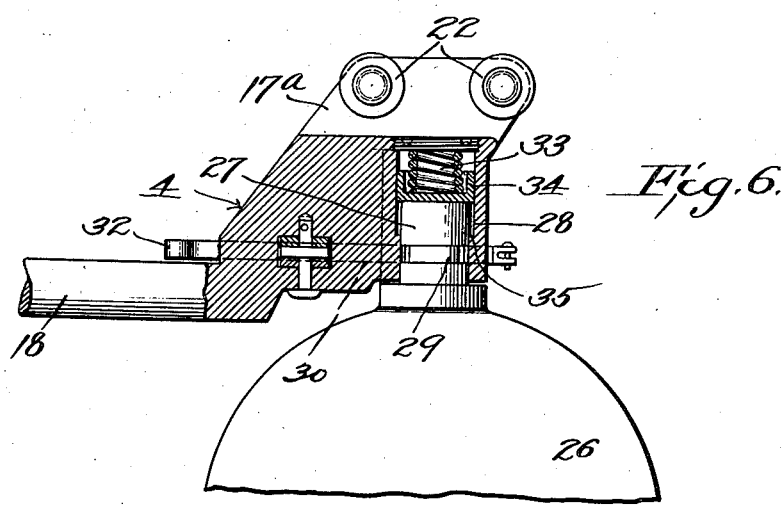
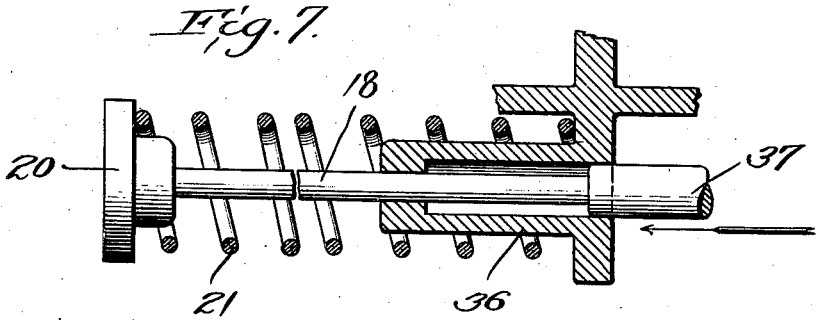

UNITED STATES PATENT OFFICE.

FRED P. PEEL, OF WASHINGTON, DISTRICT OF COLUMBIA.

SPEED-INDICATOR AND PACKAGE-DROPPER FOR AIRSHIPS.

1,081,984.  Specification of Letters Patent.  Patented Dec. 23, 1913.

Application filed July 22, 1912. Serial No. 710,848.

*To all whom it may concern:*

Be it known that I, FRED P. PEEL, citizen of the United States, residing at Washington, in the District of Columbia, have invented certain new and useful Improvements in Speed-Indicators and Package-Droppers for Airships, of which the following is a specification.

The present invention relates to a novel device for indicating the speed of an airship or like craft, and also for dropping a package, article, weight, bomb, or the like from the airship with a zero or other predetermined velocity in the direction of travel of the airship.

Among the objects of the invention is to provide a device of this character which embodies novel features of construction for indicating the actual velocity of the airship or craft with respect to the earth, proper allowance being made for the resistance of the air to the movements of the craft and for adverse wind currents.

A further object of the invention is to provide a device of this character which includes novel means for dropping a package or article with a zero or other predetermined velocity in the direction of travel of the airship, the articles being ordinarily released with a zero velocity so as to drop downward in a substantially vertical line. This eliminates the necessity of making mental or arithmetical calculations for determining the exact time at which to release the article, since the article drops in a substantially vertical path and can be released at the instant the airship is directly over the spot upon which the article is to be dropped. This is a very important feature of the invention, since it is impossible with any device known at the present time to instantly determine or constantly record the exact height of the craft above the surface of the earth, owing to the fact that there is a constant rise and fall of the surface of the earth as the craft travels over the same. With the present device it is not necessary to take into consideration the altitude of the craft, for the article when released will fall directly downward and strike the spot directly below it regardless if that spot is on the roof of a high building or on the pavement of the street below.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a side elevation of a speed indicator and article dropper constructed in accordance with the invention, the device being shown as applied to an aeroplane and parts being shown in section. Fig. 2 is an enlarged transverse sectional view on the line 2—2 of Fig. 1. Fig. 3 is a similar view on the line 3—3 of Fig. 1. Fig. 4 is also a similar view on the line 4—4 of Fig. 1. Fig. 5 is an enlarged detail view of the trip mechanism for releasing the article. Fig. 6 is an enlarged vertical sectional view through the article receiving carriage, showing further details of the trip mechanism, and Fig. 7 is an enlarged detail view of the buffer for absorbing the shock and jar when the carriage reaches the limit of its movement.

Corresponding and like parts are referred to in the following description and indicated in all the views of the drawings by the same reference characters.

The combined speed indicator and article dropper contemplated by the present invention can be applied to any form of air craft, either of the lighter than air or heavier than air type. For the purpose of illustration the device is shown as applied in the present instance to an aeroplane A, which is equipped with the usual engine 1 and drive shaft 2 to which the propeller 3 is applied. The main frame 4 of the present device is shown as arranged under the lower plane of the aeroplane with the longitudinal axis thereof substantially parallel to the line of flight of the aeroplane. For convenience in mounting the device in position, the aeroplane is shown as provided with the downwardly extending brackets 5 to which the frame 4 of the device is secured.

A longitudinal shaft 6 is journaled within suitable bearings at opposite ends of the frame 4, the intermediate portion of the shaft being threaded and engaging a runner 7 which is mounted to move back and forth along a suitable scale 8, the said runner being shown as provided with a pointer 9 adapted to coöperate with the graduations of the said scale 8 to indicate the actual speed of the craft.

The numeral 10 designates a fan blower which receives power from the drive shaft 2 and may be connected thereto in any suitable manner as by means of the belt 11 and pulleys 12. A suitable pipe or conduit 13 leads from the fan blower 10 to a fan 14, the rotary part of the said fan 14 being rigid with one end of the longitudinal shaft 6. It will thus be obvious that when the engine 1 of the aeroplane is in operation, the fan blower 10 will be driven, and the air from this fan blower 10 will act upon the fan 14 and tend to rotate the shaft 6, the turning moment of the fan 14 being proportionate to the driving power of the aeroplane and increasing or decreasing as the said driving power increases or decreases.

A resistance fan 15 at the forward end of the shaft 6 is acted upon by the air as the aeroplane moves forward and this resistance fan 15 tends to turn the shaft 6 in an opposite direction, or to resist the rotation of the shaft 6 produced by the fan 14. A spiral spring 16 which has the outer end thereof secured to the main frame 4 and the inner end thereof secured to the shaft 6, also tends to resist the turning of the shaft 6 by the fan 14. In other words, the resistance fan 15 and spring 16 both tend to turn the shaft 6 in the same direction and have an opposite turning moment to that of the fan 14. The spring 16 normally tends to rotate the shaft 6 to bring the runner 7 to a zero position, and the said spring is constructed to offer an increasing resistance to the rotation of the shaft 6 as the said shaft is rotated to move the runner 7 away from the zero position.

The characters and graduations upon the scale 8 are designed to indicate the speed of the air craft with respect to the earth. When the craft is at rest and the engine 1 is not running, the spiral spring 16 will rotate the shaft 6 to bring the runner 7 to a zero position. Also, when the craft is in flight and there is no resistance or adverse air currents, the speed of the craft will be determined entirely by the power of the engine. Under these conditions the resistance fan 15 will offer no resistance to the rotation of the shaft 6 by the fan 14, although the resistance of the fan 15 will be less than that offered by the said fan when the machine is traveling against an adverse air current and greater than the resistance offered by the fan when the machine is traveling with a favorable air current. The rotation of the shaft 6 under the above conditions will continue until the turning moment of the fan 14 is exactly equal to the combined turning moments of the spring 16 and resistance fan 15. The shaft 6 will then cease to rotate and the runner 7 will have been moved to a proper position upon the scale 8 to indicate the actual speed of the craft. When the engine is running full speed, the runner 7 will be shifted to the extreme rear end of the shaft 6, since the craft will then attain its highest velocity. However, when the craft encounters resistance or is moving against an adverse air current, the actual velocity thereof with respect to the earth will necessarily be considerably decreased. It will also be apparent that a lower velocity will be indicated by the runner 7, since under these conditions the resistance fan 15 will aid the spiral spring 16 in resisting the tendency of the fan 14 to rotate the shaft 6. In other words, the shaft 6 will now be rotated by the fan 14 until the combined turning moments of the resistance fan 15 and spring 16 become equal to the turning moment of the fan 14. Proper allowance is thus made for the resistance of the air to the passage of the craft, and the various parts are so proportioned and adjusted that the position of the runner with respect to the scale 8 will accurately indicate the actual speed of the craft with respect to the earth.

The main frame 4 is formed with a track 4ª which extends under the shaft 6 and is shown as having a cross section somewhat similar to that of an I beam. A carriage 17 is mounted to travel upon this track 4ª, the said carriage being connected to one end of a rod 18 which passes loosely through a suitable guide opening in a lug or ear 19 which projects downwardly from the rear end of the frame 1. The end of the rod 18 terminates in a head 20, and a helical spring 21 which surrounds the rod 18 is interposed between the said head 20 and the lug 19. The spring 21 is normally under tension, and tends to move the carriage 17 rearwardly with a constantly increasing velocity. The carriage 17 may be of any suitable construction, and in the present instance it is shown as formed with the upwardly extending side flanges 17ª which straddle the bottom of the track 4ª and carry the rollers 22 which support the carriage and travel upon the lower flanges of the said track. The carriage 17 is thus mounted so as to travel freely back and forth upon the track 4ª, and a suitable latch means 23 is provided for holding the carriage at the forward end of the track against the tension of the spring 21. A lever 24 may be utilized for releasing the latch 23, the said lever being shown as connected to a cord or rod 25 which is adapted to be pulled in any suitable manner when it is desired to release the carriage.

The member 26 which it is desired to drop is formed with a stem 27 adapted to be inserted in a socket 28 in the bottom of the carriage 17. This stem 27 is formed with an annular groove or depression 29 which is adapted to be engaged by the fingers 30 for the purpose of holding the article in position. The free ends of the fingers 30 are connected by a tension spring 31, while the pivot ends thereof are formed with cam extensions 32. These cam extensions 32 are adapted to engage and pass between a pair of releasing arms 7ª which are pendent from the runner 7. It will thus be obvious that when the operator pulls upwardly upon the cord or rod 25 and releases the latch mechanism 23, the spring 21 will draw the carriage 17 toward the rear end of the track 4ª with a constantly increasing velocity. However, as soon as the cam extensions 32 of the fingers 30 engage the releasing arms 7ª, said cam extensions 32 will be forced together and the fingers 30 forced apart so as to become disengaged from the annular groove 29 of the stem 27. The article 26 is then released from the carriage 27 so as to fall from the craft. If desired, a spring 33 may be utilized for forcibly ejecting the article 26 downwardly as soon as released. In the present instance this spring 33 is shown as interposed between the base of the socket 28 and a piston 34 which operates within the socket, the outward movement of the piston being limited by engagement with a shoulder 35.

The spring 21 is so constructed and the parts are so arranged that the velocity of the carriage 17 after it has been released increases in exact accordance with the characters upon the scale 8. In other words, the carriage at any point in its travel has the velocity indicated by the character upon the scale directly above the same, although the velocity of the carriage is in a reverse direction to the velocity of the craft.

Under normal conditions it is desired to release the article 26 when it acquires a backward velocity with respect to the craft which is exactly equal to the forward velocity of the craft with respect to the earth. The article would then be dropped with a zero velocity in the direction of travel of the air craft, and being forcibly ejected downward by means of the spring 33 would drop in a substantially vertical line and be affected but little by external forces. The article would thus be released at the moment when the craft was directly over the spot upon which it might be desired to drop the article, thereby eliminating the necessity for making a rough estimate of the height of the craft above the surface of the earth and making allowances for the curved path traversed by the article after being released, the said curved path being the result of the action of gravity and the forward velocity of the article which it initially receives from the craft. The runner 7 is automatically positioned at a point upon the scale 8 corresponding to the actual velocity of the craft with respect to the earth, and since the speed of the carriage 17 increases and always corresponds to the characters upon the scale immediately above the same, it will be observed that when the carriage 17 reaches the releasing arm 7ª of the runner 7, the carriage and article will have a velocity in a backward direction with respect to the aeroplane which is exactly equal to the forward velocity of the aeroplane with respect to the earth. At this moment the cam extensions 32 of the fingers 30 are forced inwardly by the releasing arms 7ª so as to disengage the fingers 30 from the groove 29 of the stem 27. This spring 33 then shoots the article 36 vertically downward, and since the horizontal or lateral velocity of the article is zero, the article will drop in a substantially vertical path. What really happens to the article is this. While the carriage is held at the forward end of the track 4ª, the article has the same velocity as the craft and in the same direction, although as soon as the carriage 17 is released and starts to move rearwardly, the actual velocity of the article with respect to the earth begins to decrease and approach zero. The object of this mechanism is to automatically release the article from the carriage at the instant that its velocity reaches zero, or any other predetermined point, as may be found desirable. Not only is the article released at this moment, but it is also given a downward push. The force of gravity plus this initial downward push will give the article such a vertical velocity that the wind or air currents will have little effect upon the course of the fall.

The downwardly projecting ear 19 is shown as provided with an air chamber 36 which surrounds the rod 18. It will also be observed that the said rod 18 is provided adjacent the carriage 17 with an enlarged portion 37 which is adapted to enter the air chamber 36 and act as a piston within the same when the carriage reaches the limit of its movement. An air cushion or buffer is thus provided which serves to absorb the shocks and jars which would otherwise be incident to the striking of the carriage 17 against the lug 19 when the carriage reached the limit of its movement.

Having thus described the invention, what I claim as new and desire to secure by Letters Patent, is:—

1. An article dropper for airships including means for projecting an article in a rearward direction with a constantly increasing acceleration, means controlled automatically by the speed of the airship for releasing the article when the article has a zero velocity with respect to the earth, and means for positively projecting the article downwardly when released.

2. A device of the character described including a frame adapted to be applied to an airship, article engaging means upon the frame, means for releasing the article with a predetermined velocity in a lateral direction, and means for simultaneously projecting the article downward.

3. A device of the character described including a frame adapted to be applied to an airship, article engaging means movably mounted upon the frame, means for moving the article engaging means with an accelerated velocity, and means for releasing the article when a predetermined velocity is acquired.

4. A device of the character described including a frame adapted to be applied to an airship, article engaging means movably mounted upon the frame, means for moving the article engaging means with an accelerated velocity in a direction reverse to the direction of flight, and means for automatically releasing the article when a zero velocity with respect to the earth is reached.

5. A device of the character described including a frame adapted to be applied to an airship and formed with a track, an article engaging carriage movable upon the track, means for causing the carriage to move along the track with an accelerated velocity, and trip means for automatically releasing the article from the carriage when the carriage reaches a predetermined velocity.

6. A device of the character described including a frame adapted to be applied to an airship and formed with a track, an article engaging carriage mounted to travel upon the track, spring actuated means for causing the carriage to travel upon the track with an accelerated velocity, latch means normally holding the carriage against the tension of the spring actuated means, means for releasing the latch, and automatic means for releasing the article from the carriage when the carriage reaches a predetermined velocity.

7. A device of the character described including a frame adapted to be applied to an airship and formed with a track, a runner mounted upon the frame, automatic means for positioning the runner at a point corresponding to the speed of the airship, an article engaging carriage mounted upon the track, means for moving the carriage along the track with an accelerated velocity, and trip means actuated by the runner for releasing the article from the carriage.

8. A device of the character described including a frame adapted to be applied to an airship and formed with a track, a runner mounted upon the frame, automatic means for moving the runner and positioning the same according to the speed of the airship, the said runner moving along one side of the track, an article engaging carriage mounted upon the track, spring actuated means for moving the carriage with an accelerated velocity, a latch for holding the carriage against the said spring actuated means, means for operating the latch, and trip means adapted to be actuated by engagement with the runner for releasing the article from the carriage.

9. A device of the character described including a frame adapted to be applied to an airship and formed with a track, a shaft arranged substantially parallel with the track and journaled upon the frame, a runner mounted upon the frame and having an operative connection with the shaft so as to be moved by the rotation thereof, means actuated by the driving mechanism of the airship for tending to rotate the shaft in one direction, means for opposing the rotation of the shaft with a force corresponding to the resistance of the air, the position to which the runner is moved corresponding to the speed of the airship, an article engaging carriage mounted upon the track, spring actuated means for moving the carriage along the track with an accelerated velocity, a latch holding the carriage against the action of the spring actuated means, means for operating the latch, and trip means actuated by the runner for releasing the article from the carriage.

10. A device of the character described including a frame adapted to be applied to an airship and formed with a track, a shaft journaled upon the frame and arranged substantially parallel to the track, a runner mounted upon the frame and having an operative connection with the shaft so as to be moved by the rotation thereof, means actuated by the driving mechanism of the airship for tending to rotate the shaft with a force corresponding to the driving power of the airship, means tending to resist the rotation of the shaft with a force corresponding to the resistance of the air to the airship, the position to which the runner is moved corresponding to the actual speed of the airship, an article engaging carriage mounted upon the track, spring actuated means for moving the carriage with an accelerated velocity, a latch for holding the carriage against the spring actuated means, means for operating the latch, and trip means upon the carriage adapted to be actuated by engagement with the runner for releasing the article.

11. A device of the character described including a frame adapted to be applied to an airship and formed with a track, a shaft journaled upon the frame and arranged substantially parallel to the track, a runner mounted upon the frame and having an operative connection with the shaft so as to be moved by the rotation thereof, means actuated by the driving mechanism of the airship for tending to rotate the shaft in one direction, a spring offering an increasing yielding resistance to the rotation of the shaft by the said means, a resistance fan applied to the shaft and also opposing the rotation thereof by the said means, the position to which the runner is moved corresponding to the speed of the airship, an article engaging carriage mounted upon the track, spring actuated means for moving the article engaging carriage with an accelerated velocity, a latch for holding the carriage against the spring actuated means, means for operating the latch, and trip means upon the carriage actuated by engagement with the runner for releasing the article from the carriage.

In testimony whereof I affix my signature in presence of two witnesses.

FRED P. PEEL.

Witnesses:
 EDW. R. WALTON, Jr.,
 H. S. HILL.